Feb. 21, 1967  R. D. COLCHAGOFF  3,305,344
NECK MOLD AND PLUNGER UNIT FOR GLASS FORMING APPARATUS
Filed Sept. 6, 1963  2 Sheets-Sheet 1
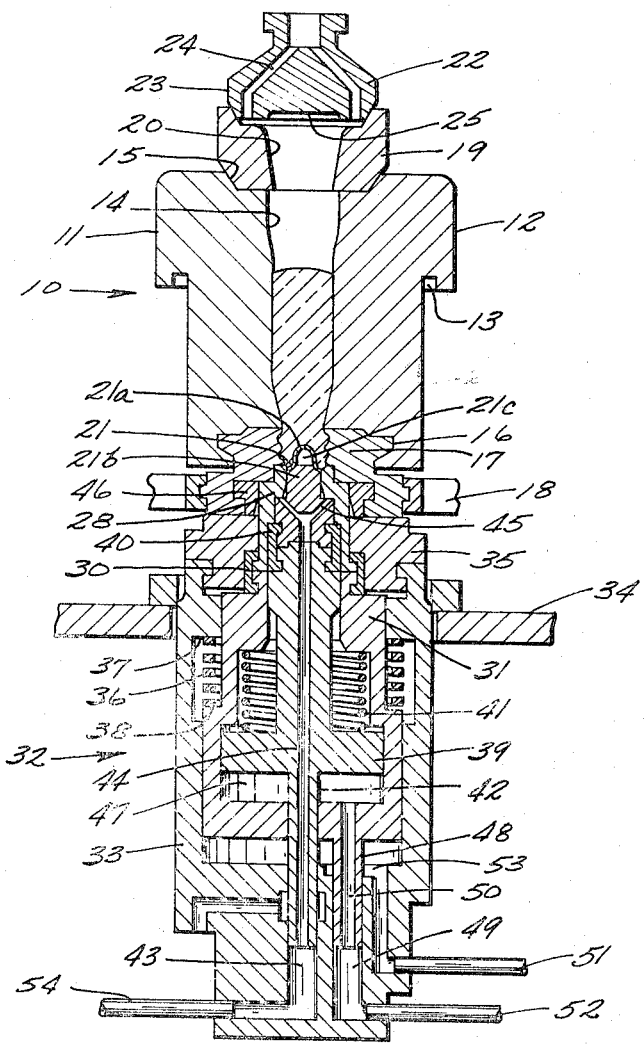
INVENTOR.
ROBERT D. COLCHAGOFF
BY J. R. Nelson and
W. A. Schaich
ATTORNEYS Feb. 21, 1967 R. D. COLCHAGOFF 3,305,344
NECK MOLD AND PLUNGER UNIT FOR GLASS FORMING APPARATUS
Filed Sept. 6, 1963 2 Sheets-Sheet 2
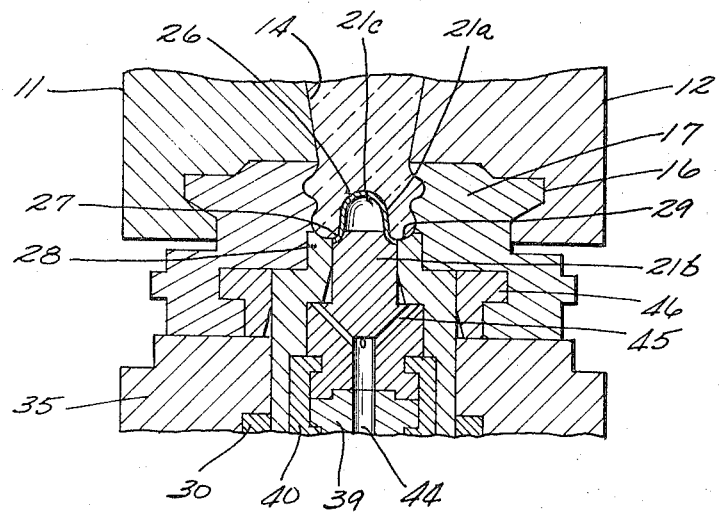
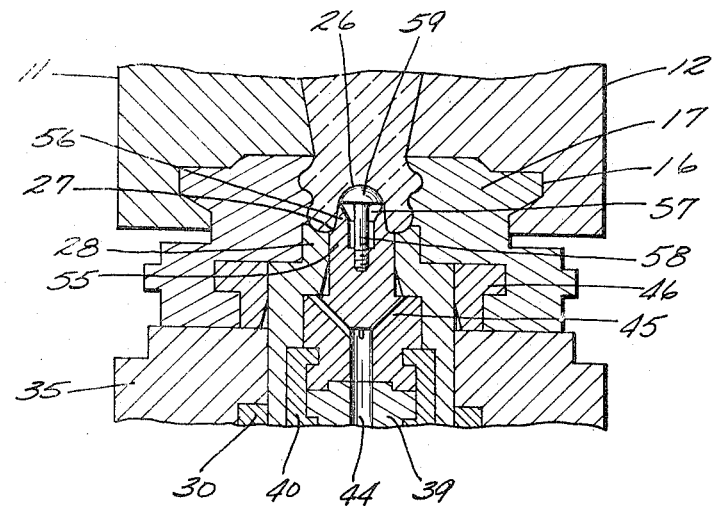
INVENTOR.
ROBERT D. COLCHAGOFF
BY J. R. Nelson and
W. A. Schaich
ATTORNEYS United States Patent Office 3,305,344
Patented Feb. 21, 1967

3,305,344
NECK MOLD AND PLUNGER UNIT FOR
GLASS FORMING APPARATUS
Robert D. Colchagoff, Toledo, Ohio, assignor to
Owens-Illinois Inc., a corporation of Ohio
Filed Sept. 6, 1963, Ser. No. 307,104
6 Claims. (Cl. 65—357)

The present invention relates to improvements in glassware forming apparatus for forming hollow articles of glassware, and more particularly relates to a parison forming unit on a glassware machine where articles such as bottles or like glass containers are produced by forming a parison in a molding unit and transferring that parison to a blow molding unit by which the final bottles are shaped in a blow mold.

In the known blow-and-blow process of making bottles and like ware, a charge of molten glass is loaded into a partible blank mold and neck mold while the two are assembled in glass forming position. The neck mold has an end opening into which is inserted a neck pin or neck plunger. This plunger will shape the corkage bore at the neck of the bottle and also form a bubble in the glass into which air under pressure is introduced to blow the glass charge to a hollow shape in the blank mold and neck mold. The neck finish part of the ware is thus shaped in the parison forming unit and this portion of the glass, that is the neck, is held in the neck mold for transfer of the parison to the blow mold after the blank mold is removed from the rest of the parison.

In prior machines operating by the blow-and-blow process, the glass is settled into the neck mold and in contact with the metal neck pin. Heat is extracted from the glass by the neck pin at a rate such that a skin or enamel is set up on the surface of the glass of the corkage bore and internal bubble defined by the neck pin. The neck pin is withdrawn from contact with the glass to allow application of counterblow air into the corkage bore and bubble for blowing the glass out to shape in the parison cavity. However, since the bubble has had an enamel form on its surface by the mentioned heat extraction, counterblowing cannot be done successfully until the enamel of the bubble has reheated and softened by heat from the interior of the mass of the glass charge. The enamel on the corkage bore may soften in the meanwhile to the extent that it may distort or bulge inwardly during counterblowing and this may lead to a "choke" in the neck, i.e. the corkage bore may be excessively diminished in diameter in some region of the neck. The reheat allowed to soften the enamel of the bubble is known as "corkage reheat" and it is performed by withdrawing the plunger and allowing the glass to remain in a quiescent state for a period until the bubble surface or end has softened sufficiently for counterblowing. The counterblowing air will then expand the bubble and move the glass along the mold cavity. But, as the charge of glass is settled in the blank mold, the peripheral portions also form an enamel or skin due to extraction of the heat by the metal of the mold. This skin gets progressively stronger during corkage reheat, and when counterblowing is done the stiff glass of the enamel along the mold walls is reluctant to distribute in the mold. The hotter, less viscous, center glass of the charge will distribute along the remainder of the mold wall in shaping the parison. Thus, along the mold wall the parison is made up of adjacent regions of glass that have received differential thermal treatments. When the parison is thereafter blown to bottle shape in the blow mold it will be distributed in the wall of the bottle in accordance with the thermal characteristics established in the glass in the blank mold. The mentioned region of differential thermal treatment of the parison forms a "settle wave" appearance in the final blown bottle.

An object of the present invention is to provide a parison molding unit capable of eliminating "settle wave."

Another object of the invention is to provide a parison molding unit for forming narrow neck blow-and-blow glassware and eliminate "chokes" in the necks of the ware.

A further object of the invention is to provide such a unit in which the neck pin will form a soft glass surface on the bubble formed thereby, and the glass forming the corkage bore of the neck will be firm at the end of settle blow or settling the glass of the charge in the parison cavity so that the bubble may be blown immediately upon withdrawal of the neck pin from the glass without waiting a period for corkage reheat.

A still further object of the invention in the accomplishment of the foregoing is the provision of a novel neck pin of which there are two embodiments disclosed.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a sectional elevational view of an I.S. type glass parison forming apparatus including one embodiment of the present invention.

FIG. 2 is an enlarged sectional elevational view of a part of the apparatus of FIG. 1 and illustrates in greater detail the one embodiment of the present invention.

FIG. 3 is an enlarged sectional elevational view like FIG. 2 illustrating in detail a second embodiment of the present invention.

Referring to FIG. 1, an inverted blank mold 10 comprised of half sections 11 and 12 are mounted on mold arms (not shown) at the re-entrant flange 13. The arms are manipulated for moving the mold sections 11 and 12 toward and away from each other, and, as shown, the mold sections are in a glass forming position. The sections 11 and 12 are the body mold of the parison forming unit and define a parison cavity 14 which has a top opening around a baffle seating surface 15 and a lower opposite end opening. The mold 10 fits around an annular dovetail 16 of a closed partible neck mold 17 carried on the I.S. invert arms 18 in a conventional manner. The neck mold in its closed glass forming position defines the neck finish forming cavity for a given bottle. The cavity conforms to and registers with the lower end opening of the blank mold. The top opening of the blank mold receives a funnel member 19 having a central, axial guide passage 20 for a "gob" of glass. The "gob" of glass is the form of mold charge fed to the parison forming unit.

After the glass gob is loaded to the cavity 14, the glass must be settleblown, as shown on FIG. 1, to form the glass in the neck mold and around a neck pin 21. To do this, a baffle 22 is brought over the funnel 19 and seated on the seat face 23 of the funnel. The baffle has air passages 24 connected to a source of air under pressure. As conventional practice, the machine timing and control system (not shown) provides for moving the baffle 22 to seat on the surface 23 of the funnel, it turns on the settleblow air for a predetermined time, and when the glass charge is settleblown in the mold, the baffle is moved away from the funnel seat 23. In rapid sequence, the funnel is then lifted and removed from the baffle seat 15 on the mold and the baffle is brought onto the baffle seat 15 of the mold 10. The baffle has an end forming surface 25 which closes the end opening of the cavity 14 and provides a surface for forming the end of the parison opposite the neck finish. The timing system and fluid-operated mechanism for achieving these manipulations are described in the Ingle Patent 1,911,119 and should easily be comprehended from that description by those skilled in the art without further burdening this disclosure with a detailed description of such mechanisms.

Associated with the underside of the neck mold 17 is the neck pin unit 21. As may be seen on FIG. 2, this neck pin or plunger is constructed so that the nose portion 21a which contacts the glass is shaped of a thin shell of metal in a hollow convex shape having its margins flared outwardly. This hollow shell 21a is attached to the circular end of the neck pin body 21b formed of solid metal and having an annulus that forms an outwardly flaring radius to match the flared peripheral open end portion of the shell 21a. With these two pieces attached, such as by welding or other suitable means, a hollow, dead-air space is formed in the plunger nose chamber 21c. Thus, the main nose portion of the plunger, which will form the bubble contour 26 in the glass, is thermally insulated from the metal of the main body of the plunger 21c. This is designed to control the operating temperatures of each portion of the glass contacting surfaces of the plunger by controlling the wall thickness of the metal behind these glass contacting surfaces. Control of the wall thickness of the plunger, in turn, controls the amount of heat flow from the plunger tip in contact with the glass at the bubble 26 into the cooler, main body 21b of the plunger. The plunger tip 21a shown will operate very hot at its bubble forming end or nose and will run progressively cooler to the point where the shell 21a and body 21b are joined at the outwardly flared radius, because of the wall thickness of the metal and the relative proximity to the main plunger body metal. This temperature differential will be imparted to the bubble surface and when the plunger is withdrawn, as will be described more in detail herein, the formed bubble may be blown immediately by application of the counterblow air without waiting for any reheat period, such as the corkage reheat mentioned earlier herein. The glass at the corkage bore 27 formed by the plunger 21 will be firm because of the proximity of the metal of the body 21b thereat for extracting a larger amount of heat; while the glass at the bubble 26 will be soft and immediately in condition for blowing in the blank mold. The firm glass of the corkage bore, since it has an enamel or skin provided by the mentioned degree of heat transfer from the glass, will remain firm and cool progressively once the neck pin is pulled because there is no time for reheat of this corkage bore glass when counterblow is applied almost immediately. This eliminates substantially the choked neck defects often encountered in the process when the nature of the apparatus required reheat time, etc. in the process.

Referring to FIGS. 1 and 2, the neck pin 21 reciprocates in a tubular thimble 28 positioned in glass forming relation with the neck mold 17 such that the upper edge 29 is inwardly contoured and provides the radius at the outer rim or crown of the neck finish that is adjacent the corkage bore thereof. The thimble is connnected by the clamp 30 to the outer hollow piston 31 of the fluid-operated cylinder-piston assembly, referred to generally at 32. This assembly includes a cylinder housing 33 fastened to the frame 34 of the machine. The cylinder 33 has an upper cylinder head 35 which retains clamps 30 and forms a reciprocal guide for thimble 28. In cylinder 25 is the axially slidable hollow piston member 31. Coil spring 36 is compressed between a flange 37 on the inside of cylinder 33 and a radial boss 38 on piston 31. The spring normally lowers or retracts piston 31 and thimble 28. A second piston 39 is coaxially mounted for reciprocal movement in piston 31. This neck pin 21b is attached by means of clamp 40 to the upper end of piston 39. A second coil spring 41 is compressed between piston 31 and piston 39 which normally retracts or lowers the neck pin 21. At the underside of piston 39 is tubular extension 42 which telescopically fits in bore 43 on the central axis of cylinder 25. This tubular piece 42, piston 39 and neck pin 21 are axially bored to provide passage 44 that branches in a Y connection 45 opening at the sides of the neck pin body 21b. The thimble 28 is guided by guide ring 46 about which the neck mold sections 17 close to locate the latter in a piloted glass forming position. The piston 31 provides an internal cylinder 47 which accommodates the second piston 39. Offset at the underside of piston 39 is a lower tubular extension 48 which fits telescopically into a bored passage 49 in cylinder 33. Tubular member 48 has a passage 50 connected with the lower end of cylinder 47.

Air or fluid pressure lines 51 and 52 are respectively connected into the lower end of cylinder 33 at port 53 and to passage 49 on the lower end of cylinder 33 to furnish fluid under pressure for raising the pistons 31 and 39, respectively. A conduit 54 is connected to the passage 43 to supply counterblow air into passages 44 and 45 and through thimble 28 at the proper time when neck pin 21 is retracted or withdrawn. The fluid lines 51, 52 and 54 are each connected to a conventional timing valve operated in sequence by the machine timing drum for control of application of fluid under pressure to the mechanism at the proper time. An example of this desired timing sequence for immediate action in pulling the neck pin after settling the glass in the blank-mold neck-mold combination is given in a copending application Serial No. 253,541, filed January 24, 1963, owned by the assignee of this application.

In the structure shown, air is admitted to line 51 to extend the thimble 28. The neck mold 17 is next closed and the blank mold sections 11 and 12 thereafter closed on the neck mold. Pressure is admitted to line 52 to raise or insert the neck pin 21 through the thimble into the cavity of the neck mold. The parts of the apparatus are now in glass forming position ready to receive a gob or charge of molten glass fed through the funnel.

A second embodiment of the invention is shown on FIG. 3 and common parts used in this embodiment are given the same numbers as used in the above description of the embodiment FIGS. 1 and 2. A second structure of neck pin is shown in which the neck pin main body 55 has an integral upper side wall 56 that extends axially of the outwardly flared radius portion to define the corkage bore 27 of the bottle's neck finish. The wall 56 of the neck pin body is tapered to a thin annular edge at its end. The body is formed with a recess or space 57 inwardly of said annular end of the wall 56 and a threaded bore is disposed axially and inwardly of the neck pin body to receive the threaded rod 58 of the tip 59. Tip 59 is a generally hemispherically shaped head piece on the rod 58 which has an edge periphery that matches the upper annular edge of the wall 56 of the neck pin. This juncture where the tip 59 and wall 56 meet is nearly a line contact between the two parts and thus the juncture is a poor thermal conductor for heat from the glass at the bubble region 26 into the main body 55 of the neck pin. The air space 57 acts as an insulator for heat transfer from the glass of the bubble 26.

Thus, the invention provides, as the two above described embodiments illustrate, a neck pin structure in which the hollow tip of the neck pin or plunger has a zone of low thermal conductivity for extraction of heat from the glass on the surface of bubble 26 of the neck undergoing forming and a zone of relatively high thermal conductivity for extraction of heat from the glass in the surface of the corkage bore 27 of the neck so that the glass of the bubble will be in softened condition suitable for blowing any time after pulling of the neck pin without any necessity for reheat, yet the glass of the corkage bore will be relatively firm and not subject to distortion by reheat time to cause a choked neck defect.

The invention permits higher rate of operation of the machine due to the elimination of the time consuming corkage reheat step in the process. Along with this, since the differential of heat treatment of the glass at the mold wall between the time of settle blowing the glass in the mold and counterblowing it is substantially reduced, i.e. by eliminating necessity for corkage reheat, the "settle wave" problem is effectively dealt with in the present invention, and settle wave in the finally blown ware is substantially eliminated.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In a parison mold assembly of a glass forming machine having a partible neck mold and cooperating thimble mounted to define the exterior neck finish of a hollow glass parison, a neck plunger unit comprising a metal body insertible through the thimble, the forward end of said body being cylindrical and formed with an annular, outwardly flaring radius which, when the neck plunger unit is fully inserted in its glass forming position, is adjacent the glass contacting surface of the thimble and located to define the rim edge at the neck of a finished glass container, a tip attached on said forward end of the body of the plunger to form a glass contacting nose of the plunger, said tip and body cooperating to define an enclosed and hollow chamber behind the nose of the plunger.

2. The assembly defined in claim 1, wherein said tip comprises a thin metal shell of substantially hollow convex shape, the outer, annular periphery of said shell being formed to attach to the cylindrical, outwardly flared radius portion of the metal body of plunger and provide said hollow chamber between the end of the body of the plunger and the shell.

3. The assembly defined in claim 1, wherein said body of the plunger extends axially of the outwardly flared portion and is hollow centrally thereof, said tip comprising a substantially hemispherically shaped head member and an axial stem, the stem attaching said tip to the body and said head member blending peripherally with the diameter of the plunger body to form a hollow ended plunger.

4. In an apparatus for molding a glass charge into a hollow parison having a body mold defining an open-ended cavity into which a charge of molten glass is introduced for forming, a neck mold communicating with one open end of the body mold and defining a neck forming cavity, a hollow thimble axially positioned adjacent the outer end of said neck cavity, a metal neck pin having a body portion and insertable through the thimble and into the neck cavity in glass forming position for engaging and forming a central bubble in the glass and thereby form a hollow neck finish defined by the neck mold, thimble and neck pin in their said glass forming position, the neck pin being constructed with a heat insulating means at its axial inner end comprised of a gaseous-space enclosure disposed between the glass in the central region of said central bubble and the metal body portion of the neck pin such that it is capable of extracting a lesser amount of heat from the interior of the bubble formed thereby and said neck pin has a relatively high heat conducting capacity in its metal body portion that is in contact with the glass near the outer rim edge of the bubble, and means connected to the neck pin for reciprocating it into and out of said glass forming position.

5. The apparatus defined by claim 4, wherein the insulating axial inner end of the neck pin comprises an axially tapered nose and an enclosure inwardly of said nose providing an insulating air space in the neck pin opposite the end portion of the neck pin in contact with the glass at the interior end of the bubble.

6. In combination, a neck mold defining a neck finish forming cavity having an axial end opening, a blank mold, means independently supporting said neck mold and blank mold in a glass forming position defining a glass parison shaping cavity, a neck pin, and means supporting the neck pin for reciprocating movement in the axial end opening of the neck finish forming cavity and into and out of said neck cavity, the neck pin comprising a body with its forward end of cylindrical shape and a hollow tip attached on the forward end of said body, the tip being inserted into the neck forming cavity by the last-named means to contact the glass and form a neck corkage bore and bubble in the glass in the neck finish forming cavity, said hollow tip providing a total enclosure for a gaseous insulating medium, thereby providing a zone of low thermal conductivity for extraction of heat from the glass in said bubble and the body providing a zone of relatively high thermal conductivity for extraction of heat from the glass in said corkage bore of the neck, so that the glass of the bubble will be in softened condition suitable for blowing upon retraction of the neck pin without the necessity reheat and the glass of the corkage bore will be firm.

References Cited by the Examiner

UNITED STATES PATENTS

| | | | |
|---|---|---|---|
| 2,988,851 | 6/1961 | Holscher | 65—356 |
| 3,148,969 | 9/1964 | Mathias | 65—356 |
| 3,171,731 | 3/1965 | Barger et al. | 65—356 |

DONALL H. SYLVESTER, *Primary Examiner.*

S. LEON BASHORE, *Examiner.*

J. H. NEWSOME, *Assistant Examiner.*